(12) United States Patent
Wondracek

(10) Patent No.: US 6,968,626 B1
(45) Date of Patent: Nov. 29, 2005

(54) HORIZONTAL PLANE VIEWABLE PRECISION BUBBLE LEVEL

(75) Inventor: Mirvan Wondracek, LaGraneville, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/710,284

(22) Filed: Jun. 30, 2004

(51) Int. Cl.[7] .............................. G01C 9/32
(52) U.S. Cl. ........................ 33/348; 33/379
(58) Field of Search .............. 33/348, 348.2, 33/379, 381, 382, 383

(56) References Cited

U.S. PATENT DOCUMENTS

| | | | | |
|---|---|---|---|---|
| 879,122 A * | 2/1908 | Saegmuller | ................. | 33/348 |
| 999,573 A * | 8/1911 | Lidholm | ................. | 33/348 |
| 1,705,146 A * | 3/1929 | Willson | ................. | 33/348 |
| 2,133,598 A * | 10/1938 | Torbet, Jr. | ................. | 33/348 |
| 2,466,829 A * | 4/1949 | Sprinkel | ................. | 33/348 |
| 2,727,314 A * | 12/1955 | Dossie et al. | ................. | 33/382 |
| 2,750,677 A * | 6/1956 | Wirth | ................. | 33/382 |
| 2,791,036 A * | 5/1957 | Gericke | ................. | 33/348 |
| 3,064,535 A * | 11/1962 | Anderson | ................. | 33/348 |
| 3,082,663 A * | 3/1963 | Zweifel | ................. | 33/348 |
| 3,618,222 A * | 11/1971 | Ostrager | ................. | 33/348 |
| 3,862,500 A * | 1/1975 | Wibom | ................. | 33/348 |
| 4,164,077 A * | 8/1979 | Thomas | ................. | 33/348 |
| 4,717,251 A * | 1/1988 | Wells et al. | ................. | 33/291 |
| 5,317,810 A * | 6/1994 | Isono et al. | ................. | 33/379 |
| 5,761,818 A * | 6/1998 | Hopkins et al. | ................. | 33/379 |
| 6,449,859 B1 | 9/2002 | Zugel et al. | | |
| 6,681,494 B1 * | 1/2004 | Bowden | ................. | 33/379 |
| 6,748,666 B2 * | 6/2004 | Zugel et al. | ................. | 33/348 |
| 2004/0177524 A1 * | 9/2004 | Tan et al. | ................. | 33/348 |

* cited by examiner

*Primary Examiner*—G. Bradley Bennett
(74) *Attorney, Agent, or Firm*—Jay H. Anderson; Eric Petraske

(57) ABSTRACT

A bubble level suitable for spaces that are restricted in the vertical dimension has a 45 degree prism attached to the top surface, so that the image of the bubble vial is deflected along a horizontal axis. The prism is optionally rotatable to permit changing the viewing angle in a horizontal plane.

10 Claims, 2 Drawing Sheets

HORIZONTAL PLANE VIEWABLE PRECISION BUBBLE LEVEL

BACKGROUND OF INVENTION

The field of the invention is that of assembling machinery, in particular setting a component level in which the ability to view a level is limited.

Spirit levels, in which a bubble of air is trapped within a vial containing a fluid, are well known in the construction and assembly field.

As shown in U.S. Pat. No. 6,449,859, a typical level comprises three vials set at varying angles with respect to an axis of the instrument, typically parallel, perpendicular and at an angle of 45 degrees.

That patent addresses the problem of arranging to view a bubble level that is placed against a nominally vertical surface having an orientation that does not permit the technician using the level to view the bubble in the usual manner.

The bubble that is to be viewed, referred to as the vertical-sensing bubble, is oriented at a right angle with respect to the level axis, so that a viewer looking at the nominally vertical surface will be looking at the bubble end on and will not be able to see the location of the bubble with respect to the reference marks. Normally, the viewer will look at the level along a viewing direction that is parallel to the surface being plumbed.

The situation addressed by this prior art patent is one in which the normal viewing direction is blocked, so that it is not possible to view the bubble in the normal fashion.

The solution provided by that patent is the provision of a mirror oriented at an angle of 45 degrees to the axis of the level and directing the image of the vertical-sensing bubble along an axis perpendicular to the surface being plumbed, so that the vertical-sensing bubble may be viewed from a head on position.

The cited patent provides a reasonable solution to the problem that it addresses, bit is specific to a situation in which there is ample clearance in the vertical direction, so that the entire length of the level, shown as being considerably longer than the height of the technician's head, can fit in the available space.

This reference does not address the problem of a confined and restricted vertical space.

The art would benefit from a level that can be viewed in a vertically restricted space.

SUMMARY OF INVENTION

The invention relates to an apparatus for viewing a level placed on a substantially horizontal surface, in which the space containing the level is restricted such that vertical viewing is blocked.

A feature of the invention is the placement of a prism that directs the image of the bubble parallel to the surface being tested.

A feature of the invention is the use of half-silvered mirror in the prism, so that a light source does not interfere with the viewing.

DETAILED DESCRIPTION

The problem addressed by the invention is having the ability to properly view a bubble level and making adjustments to an assembly in close quarters of a tool or assembly. In the course of assembling and aligning a complex apparatus, it is sometimes necessary to align and set level a surface that is blocked by other portions of the equipment, so that it is not possible to view the vial of the level while adjusting the screw or other mechanism that controls the orientation of the surface being leveled.

The ability to view the bubble while turning a wrench while making the adjustments to several components on a wafer track tool or other precision tool saves both time and possibly the use of an assistant to call out the state of the bubble. There are various examples of areas that require positional accuracy and a level attitude in the 360 degrees of the horizontal plane, thus requiring the use of a bubble level.

Figure 1:
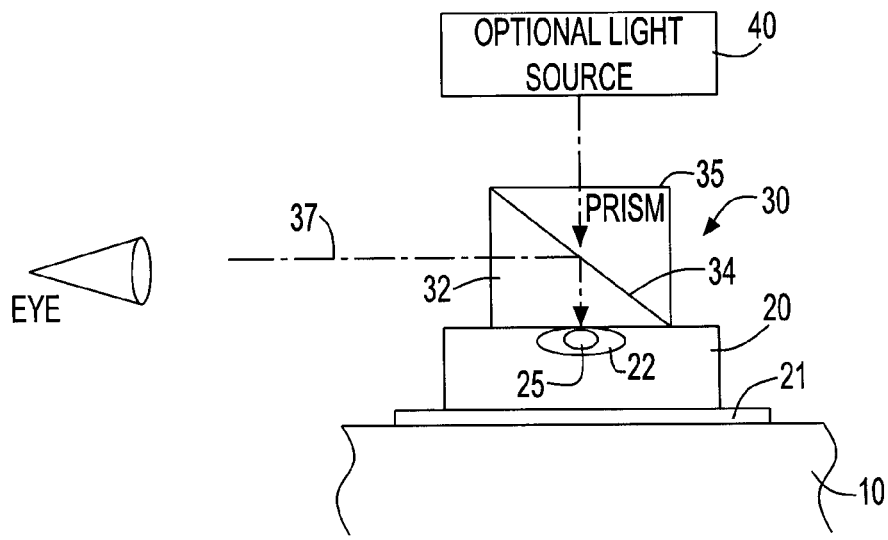
FIG. 1 illustrates an embodiment of the invention.

FIG. 1 shows a view of an arrangement that incorporates a prism in the viewing area of this bubble level in a horizontal viewing angle without the aid of a hand held mirror.

In the example, surface 10 is being leveled by adjustments not shown in the Figure. Level 20 rests on the surface 10, with the sensing bubble on the top surface and therefore viewable from above. The bottom surface of level 20 is referred to as the reference surface.

Prism 30 rests on the top surface of level 20, with a lower portion 32 in contact with the surface and an upper portion 35, separated from the lower portion 32 by half silvered mirror 34. Mirror 34 is illustratively oriented at an angle of 45 degrees with respect to the reference surface on the bottom of level 20, so that the image of the bubble travels horizontally when the reference surface is horizontal. Such half silvered mirrors are conventional in the optical field and have the well known property that light from source 40 above the prism will pass through the reflective surface, while light reflected from the bubble 25, in fluid 22, referred to as the image of the bubble, traveling upward is reflected off to the left. An alternative form of prism having polarizing properties may be used with polarized light to achieve the same effect. Both these types of prism surfaces will be referred to generally as partially transmissive. The prism may omit the upper half and have a slanting top, if desired.

Thus, it is possible to illuminate the bubble without directing excessive light into the viewer's eye (or camera lens, etc.). The illuminating light travels directly to the location where it is needed, i.e. the bubble, without interfering with the viewer's vision. Any stray light that is emitted by the source will be blocked by the surface 34 and reflected off to the right, so that it does not interfere with the desired image.

Figure 4:
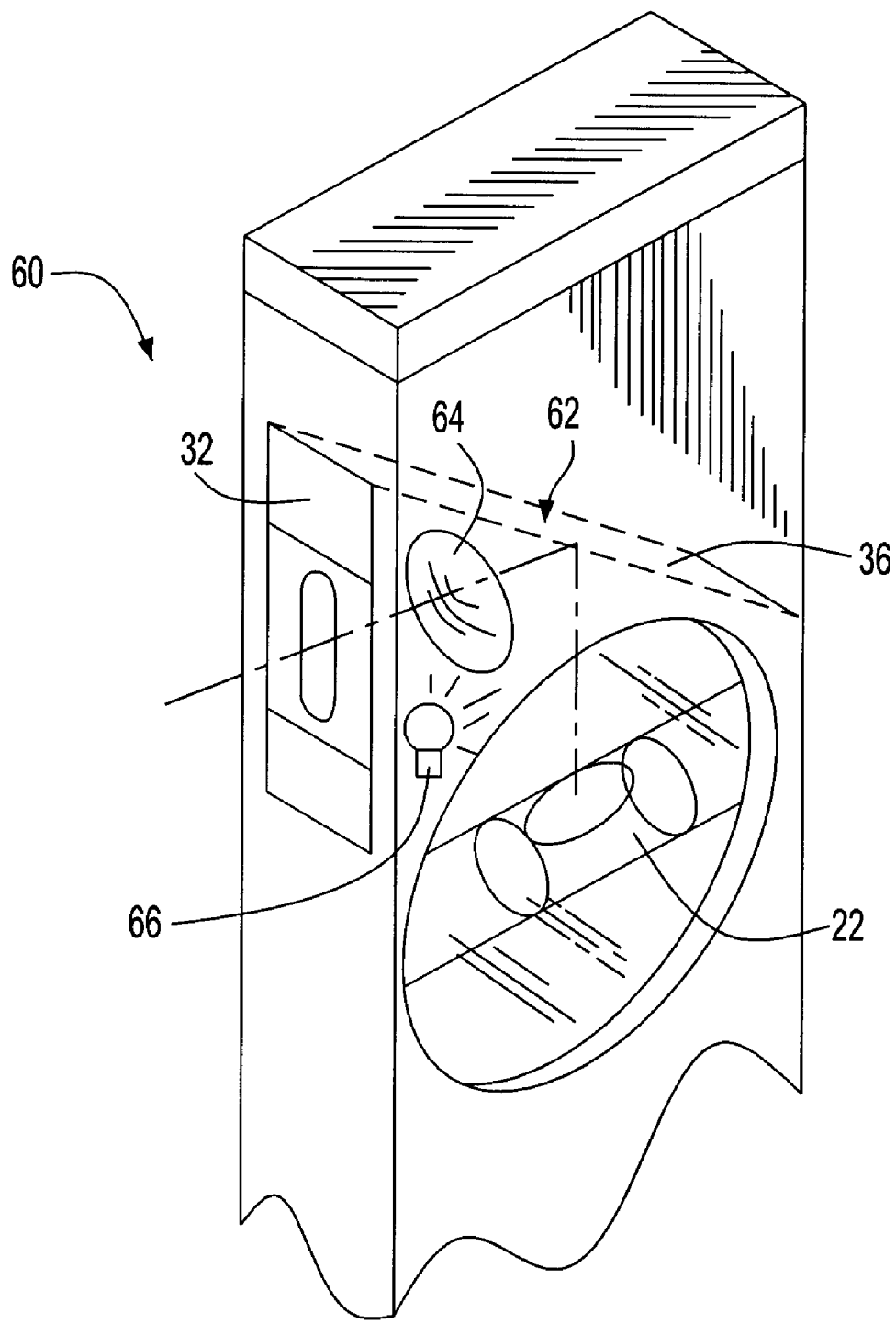
FIG. 4 illustrates a prior art example.

In contrast, as is shown in FIG. 4, the method used in the cited prior art patent places a light bulb in close proximity to the bubble, so that excessive light is bound to interfere with the viewing of adjustments. FIG. 4 is taken from the '859 patent. There, light bulb 66 will emit radiation that is mostly wasted, traveling in directions other than toward the bubble 20 and fluid 22 and shining on lens 64 as well as mirror 36.

Figure 2:
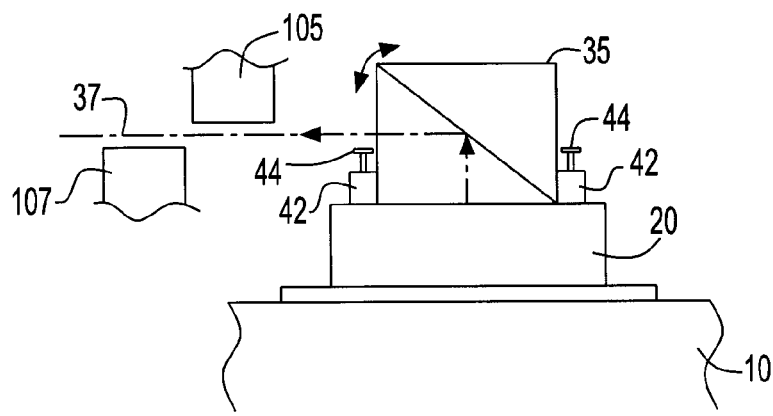
FIG. 2 illustrates an alternative embodiment.

Another variation of the same invention is to incorporate an adjustable prism mount with a locking mechanism for the desired viewing angle. FIG. 2 illustrates such a variation, in which prism 35 rests on feet 42, each of which has an adjusting screw 44. With this arrangement, the angle of surface 34 may be adjusted such that the line of travel of the bubble image is slightly above or below the horizontal. With this option it is possible for the line of sight (or line of travel of the image) 37 to be adjusted to clear obstacles such as blocks 105 and 107 which represent other components of the system that would block the view of a level with a non-adjustable prism.

Preferably, any of screws 44 may be locked in palace to maintain a desired view once it has been adjusted. Optionally, the line of sight 37 may be tilted up or down (as indicated by the arrow at the upper left corner of the prism) to clear obstacles or it may be raised or lowered while maintaining a horizontal orientation (by turning all the screws 44 the same amount) to lower or raise the line of sight to clear an obstacle.

The incorporation of a high energy LED with a self contained battery pack as light source 40 in FIG. 1 also has merit as it could be used in a remote dark area within the tool (usually the LED packs are rated for 80 hours of continuous light). The stylized symbol labeled EYE in FIG. 1 may represent a human operator or any optical device, such as a camera lens that transmits the image to a television system or equivalent that presents an image of the bubble. This image may be located at any convenient location; e.g. where the technician adjusting the orientation of the surface is located.

Figure 3:
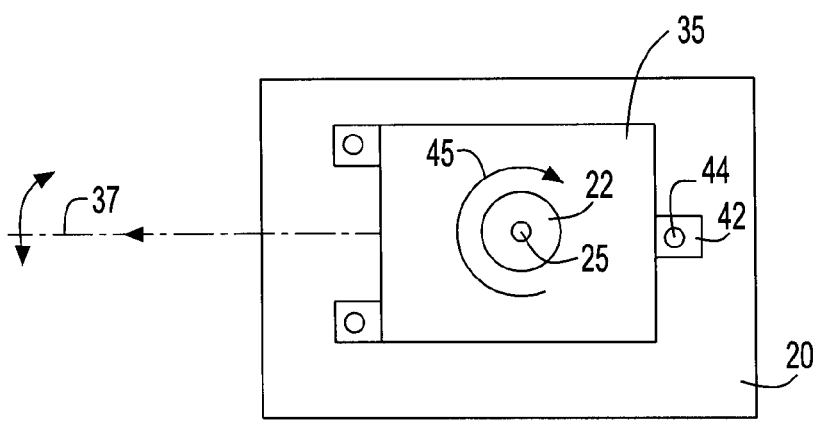
FIG. 3 illustrates another alternative embodiment.

FIG. 3 shows a top view of the embodiment of FIG. 2, with an added feature of a rotatable prism. In this view, it con be seen that there are three feet 42 with adjusting screws 44 that permit tilting the prism along one axis by turning the right-hand screw 44 and along an axis at a right angle by turning one of the two screws 44 on the left up and the other screw down by the same amount.

In addition, arrow 45 indicates that the prism 30 in this view can be rotated about a vertical axis perpendicular to the plane of the paper in FIG. 3. With this option, line of sight 37 may be rotated to clear obstacles or to permit the operator to move to a different adjustment location and still look at the level.

The vial holding the bubble is preferably of the bulls-eye type, as indicated in FIG. 3, with a circular vial 22 holding a bubble. When the bubble is centered, the surface 10 is level along any axis. This arrangement is more convenient than the arrangement shown in the prior art patent, in which the bubble is confined within a cylindrical vial, so that it responds only to adjustments on a single axis.

In operation, the sequence of actions will be to place the level on the assembly (usually deep within the tool and having only 2" to 6" of vertical clearance) and view the bubble on the level in a horizontal plane, leaving both hands free to make the adjustments.

Preferably, the location of the level will be selected for the best view. If the other components of the system block the operator's view when making leveling adjustments, the line of sight may be adjusted by raising or lowering or by tilting to clear such obstacles.

This simplifies the task of adjustment, speeds up alignment and allows for more accurate positioning of subassemblies within precision tooling.

The term vial is used as is conventional in the field to refer to the container for the fluid, regardless of its shape.

While the invention has been described in terms of a few preferred embodiments, those skilled in the art will recognize that the invention can be practiced in various versions within the spirit and scope of the following claims.

I claim:

1. A level adapted for use in limited spaces having a reference surface;
  a vial of fluid containing a bubble and having a flat lower surface disposed in contact with said reference surface, said vial being adapted to center said bubble when said reference surface is level and when said vial is oriented at any azimuthal angle;
  a prism having a 45 degree surface disposed above said vial and oriented to direct an image of said vial along a substantially horizontal line of sight;
  further comprising adjusting means in contact with said reference surface and said prism for adjusting the orientation of said prism to tilt said line of sight in a vertical plane, said adjusting means being rotatable about an axis substantially perpendicular to said reference surface while said vial is fixed, whereby said line of sight may be oriented at any azimuthal angle.

2. A level according to claim 1, in which said 45 degree surface of said prism is partially transmissive and further comprising a light source directed through said partially transmissive surface toward said vial.

3. A level according to claim 1, further comprising adjusting means for adjusting the orientation of said prism to tilt said line of sight in a vertical plane.

4. A level according to claim 2, further comprising adjusting means for adjusting the orientation of said 45 degree surface to tilt said line of sight in a vertical plane.

5. A level according to claim 1, in which said means for adjusting the orientation of said prism is adapted to rotate said line of sight in a horizontal plane while said vial remains fixed.

6. A level according to claim 5, in which said 45 degree surface of said prism is partially transmissive and further comprising a light source directed through said partially transmissive surface toward said vial.

7. A level according to claim 1, in which said vial is substantially circular, whereby said bubble responds to the orientation of said reference surface along any axis.

8. A level according to claim 7, in which said 45 degree surface of said prism is partially transmissive and further comprising a light source directed through said partially transmissive surface toward said vial.

9. A level according to claim 7, further comprising adjusting means for adjusting the orientation of said prism to tilt said line of sight in a vertical plane.

10. A level according to claim 7, further comprising adjusting means for adjusting the orientation of said 45 degree surface to tilt said line of sight in a vertical plane.

* * * * *